UNITED STATES PATENT OFFICE.

GEORGE W. WALKER, OF NEW YORK, N. Y.

IMPROVEMENT IN PROCESSES FOR PROTECTING THE BACKS OF MIRRORS.

Specification forming part of Letters Patent No. 216,587, dated June 17, 1879; application filed May 19, 1879.

*To all whom it may concern:*

Be it known that I, GEORGE W. WALKER, of the city, county, and State of New York, have invented a new and useful Process for Protecting the Backs of Mirrors, which process is fully set forth in the following specification.

This invention relates to that class of processes employed in protecting the silvered back of glass, so as to prevent the deposit of silver from becoming oxidized, to the injury of the reflective quality of the mirror.

It is well known to those skilled in the art to which my invention appertains that varnishes and other coatings of like nature for glass are permeable and susceptible to atmospheric influence, whereby the mirror is apt to be marred and to lose its value as a perfect reflector. Such ill effect of the action of air is obviated by my process.

To carry out my invention, it is, of course, necessary that the deposit of pure silver shall have been made on the glass, which deposit may be by Liebig's process, or by any other process of silvering glass, my invention being applicable to any of them, or to my own mode of depositing of pure silver. After that the silver is covered with what is known as "Demar's varnish," or with copal or other varnishes, paint, size, rubber, or any substance that will hold bronze together, and after the varnish dries a little, with a camel's-hair brush or soft piece of chamois-skin dipped in bronze-powder, the surface of the varnish is covered and rubbed until all the pores of the varnish are filled and a smooth, clear surface obtained. The bronze-powder used for this purpose is that generally known as such in the arts, without being confined to any specific kind or quality.

I am well aware that the varnishing of silvered backs of mirrors as a part protection is not new; but I do not know of any mode of rendering the varnish impervious to the atmosphere analogous to my own, as above described.

I claim as my invention—

1. The protecting from oxidation of the deposit of silver on the back of a mirror-glass by means of filling with bronze-powder the pores of the varnish thereon, substantially as described.

2. A mirror-glass the varnish on the silvering of which is made air-proof by bronzing, substantially as described.

GEO. W. WALKER.

Witnesses:
   WM. H. POST,
   WM. A. WALKER.